United States Patent
Hoefler et al.

(10) Patent No.: US 11,580,388 B2
(45) Date of Patent: *Feb. 14, 2023

(54) DISTRIBUTED PROCESSING ARCHITECTURE

(71) Applicant: Microsoft Technology Licensing, LLC, Redmond, WA (US)

(72) Inventors: Torsten Hoefler, Zurich (CH); Mattheus C. Heddes, Woodinville, WA (US); Deepak Goel, San Jose, CA (US); Jonathan R Belk, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

This patent is subject to a terminal disclaimer.

(21) Appl. No.: 16/734,092

(22) Filed: Jan. 3, 2020

(65) Prior Publication Data

US 2021/0209460 A1 Jul. 8, 2021

(51) Int. Cl.
*G06N 3/08* (2006.01)
*G06N 20/00* (2019.01)
*G06F 9/38* (2018.01)
*H04L 67/10* (2022.01)

(52) U.S. Cl.
CPC ............. *G06N 3/08* (2013.01); *G06F 9/3891* (2013.01); *G06N 20/00* (2019.01); *H04L 67/10* (2013.01)

(58) Field of Classification Search
None
See application file for complete search history.

(56) References Cited

U.S. PATENT DOCUMENTS

| 9,755,948 B1 | 9/2017 | Viljoen |
| 11,057,318 B1 * | 7/2021 | Matthews ............... H04L 45/56 |
| 2009/0240838 A1 | 9/2009 | Berg et al. |
| 2013/0201994 A1 | 8/2013 | Beshai |

(Continued)

OTHER PUBLICATIONS

Pan, et al., "Firefly: Illuminating Future Network-on-Chip with Nanophotonics", In Proceedings of the 36th Annual International Symposium on Computer Architecture, Jun. 20, 2009, pp. 429-440.

(Continued)

*Primary Examiner* — June Sison
(74) *Attorney, Agent, or Firm* — Fountainhead Law Group PC

(57) ABSTRACT

Embodiments of the present disclosure include techniques for processing neural networks. Various forms of parallelism may be implemented using topology that combines sequences of processors. In one embodiment, the present disclosure includes a computer system comprising a plurality of processor groups, the processor groups each comprising a plurality of processors. A plurality of network switches are coupled to subsets of the plurality of processor groups. A subset of the processors in the processor groups may be configurable to form sequences, and the network switches are configurable to form at least one sequence across one or more of the plurality of processor groups to perform neural network computations. Various alternative configurations for creating Hamiltonian cycles are disclosed to support data parallelism, pipeline parallelism, layer parallelism, or combinations thereof.

28 Claims, 13 Drawing Sheets

(56) References Cited

U.S. PATENT DOCUMENTS

| | | | |
|---|---|---|---|
| 2014/0351557 A1* | 11/2014 | Doerr | G06F 15/8023 |
| | | | 712/15 |
| 2018/0091437 A1* | 3/2018 | Flajslik | H04L 45/745 |
| 2018/0139153 A1 | 5/2018 | Moradi et al. | |
| 2018/0285718 A1 | 10/2018 | Baum et al. | |
| 2018/0307950 A1 | 10/2018 | Nealis et al. | |
| 2019/0057060 A1 | 2/2019 | Nicol | |
| 2019/0207868 A1 | 7/2019 | Chang et al. | |
| 2019/0266218 A1* | 8/2019 | Scott | G06F 17/16 |
| 2019/0385046 A1 | 12/2019 | Cassidy et al. | |
| 2020/0053002 A1* | 2/2020 | Heidelberger | H04L 45/14 |
| 2020/0151289 A1 | 5/2020 | Sikka et al. | |
| 2020/0311017 A1 | 10/2020 | Knowles | |
| 2020/0372334 A1 | 11/2020 | Carolan et al. | |

OTHER PUBLICATIONS

"International Search Report and Written Opinion issued in PCT Application No. PCT/US20/062097", dated Mar. 15, 2021, 11 Pages.

"International Search Report and Written Opinion issued in PCT Application No. PCT/US20/062450", dated Mar. 18, 2021, 13 Pages.

Ye, et al., "3D Optical Networks-on-Chip (NoC) for Multiprocessor Systems-on-Chip (MPSoC)", In Proceedings of International Conference on 3D System Integration, Sep. 28, 2009, 6 Pages.

"Non-Final Office Action Issued in U.S. Appl. No. 16/883,814", dated Dec. 4, 2020, 20 Pages.

* cited by examiner

US 11,580,388 B2

DISTRIBUTED PROCESSING ARCHITECTURE

BACKGROUND

The present disclosure relates to distributed computing, and in particular, to a distributed processing architecture that may be used to process artificial neural networks.

Artificial neural networks (hereinafter, neural network) have become increasingly important in artificial intelligence applications and modern computing in general. An example neural network is shown in FIG. 1. Neural network 100 receives input values corresponding to features to be recognized. The input values are multiplied by weights (represented by edges 101) and added together (e.g., summed) in nodes 102. An activation function is applied to the result in the nodes 102 to generate an output value. Values are combined across multiple nodes and layers of nodes to produce network output values corresponding to a result.

Such systems "learn" to perform tasks by considering examples, generally without being programmed with task-specific rules. Initially, the weights may be untrained. During a training phase, input values for corresponding known results are processed by the network, and the difference (or error) between the network output values is compared to known values. The weights may be adjusted based on the error using a process known as backpropagation, where computations flow in the reverse direction (e.g., from the output to the input). Training may involve successively adjusting weights across many input samples and corresponding known network output values. This is often referred to as the training phase. Once trained, the system may receive inputs and produce meaningful results (e.g., classification or recognition). This is often referred to as the inference phase.

Training and/or inference for very large neural networks may involve a massive number of computations. Accordingly, computations for large networks may be partitioned across many processors. However, due to the large number of connections in a network, partitioned network computations can involve potentially massive communications of data (partial results) between the processors. Such connectivity may require many processors coupled together through potentially many network switches, for example. Providing full bandwidth for arbitrary communication patterns can become prohibitively expensive at scale and with high bandwidths. For example, the cost of the components as well as and the energy consumption of the electrical switches and the optical transceivers needed to cover longer distances in the datacenter may be disadvantageous.

SUMMARY

Embodiments of the present disclosure include techniques for processing neural networks. Various forms of parallelism may be implemented using topology that combines sequences of processors. In one embodiment, the present disclosure includes a computer system comprising a plurality of processor groups, the processor groups each comprising a plurality of processors. A plurality of network switches are coupled to subsets of the plurality of processor groups. A subset of the processors in the processor groups may be configurable to form sequences, and the network switches are configurable to form at least one sequence across one or more of the plurality of processor groups to perform neural network computations. Various alternative configurations for creating Hamiltonian cycles are disclosed to support data parallelism, pipeline parallelism, layer parallelism, or combinations thereof.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
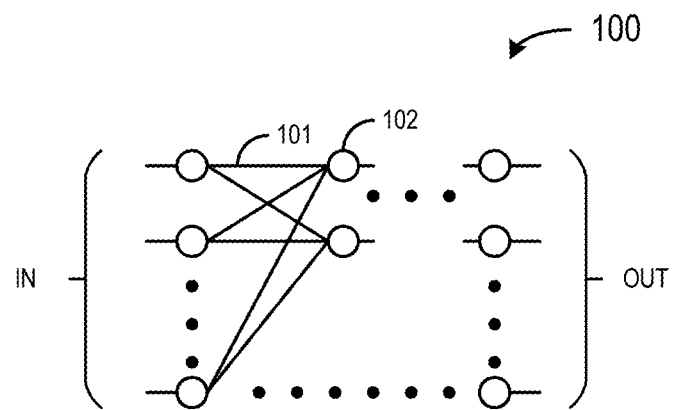
FIG. 1 illustrates an example neural network.
Figure 2:
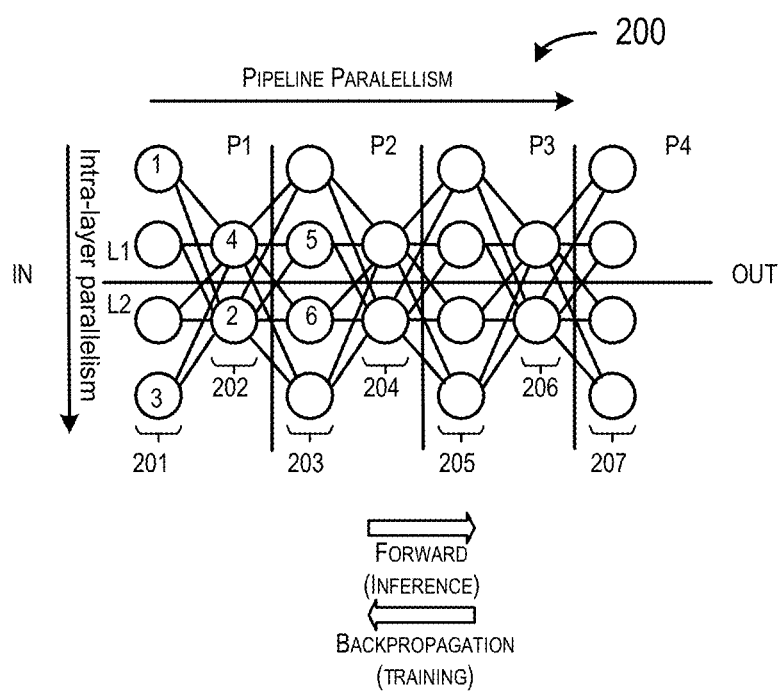
FIG. 2 illustrates a neural network partitioned according to an embodiment.

FIG. 2 illustrates an artificial neural network 200 partitioned according to an embodiment. Features and advantages of the present disclosure exploit communication patterns in neural networks to produce more efficient topologies for distributed computing of neural networks. For example, neural network 200 includes 7 layers 201-207, including an input layer 201 and an output layer 202. During inference, input values may be received on the input layer 201 and results produce on output layer 207. At each layer, data values are multiplied by weights, summed, and processed by each node using an activation function. During training, data flows in the reverse direction, where an error between a network result and an expected result is determined at the output, and the weights are updated layer by layer flowing from layer 207 to layer 201.

In various embodiments, it may be desirable to partition the neural network so that computations for different partitions of the network are performed on different processors. Example neural network 200 is a simplified network to illustrate partitions and communications between the partitions. In this example, the network may be partitioned along a pipeline (denoted Pi) or along layers of the pipeline (denoted Li). In this example, network 200 is partitioned into 4 pipeline stages, P1-P4, and 2 layers, L1-L2. Nodes and edges in partition L1,P1 may be processed on one processor, while nodes and edges in the other partitions may each be processed on other processors. However, to perform their computations, each processor must receive certain data inputs and send data outputs to other processors. For example, node 1 in partition L1,P1 may receive inputs, multiply the inputs by weights, apply an activation function, and send the outputs to node 2 in partition L2,P1. Similarly, node 3 in L2,P1 sends output data to node 4 in partition L1,P1. Accordingly, when layer 201 is partitioned across multiple processors, there is intra-layer communications that occur between the processors, for example. Similarly, pipeline communications may be illustrated as follows. An output of node 4 in partition L1,P1 is sent to the processor assigned to partition L1,P2 as an input to node 5, and an output of node 2 in partition L2,P1 is sent to the processor assigned to partition L2,P2 as an input to node 6. Likewise, an output of node 4 in partition L1,P1 is sent to the processor assigned to partition L2,P2 as an input to node 6, and an output of node 2 in partition L2,P1 is sent to the processor assigned to partition L1,P2 as an input to node 5. Accordingly, it can be seen that pipeline stage P1 communicates with pipeline stage P2, and pipeline stage P2 communicates with pipeline stage P3, but pipeline stage P3 may not need to communicate with pipeline stage P1, for example.

Figure 3:
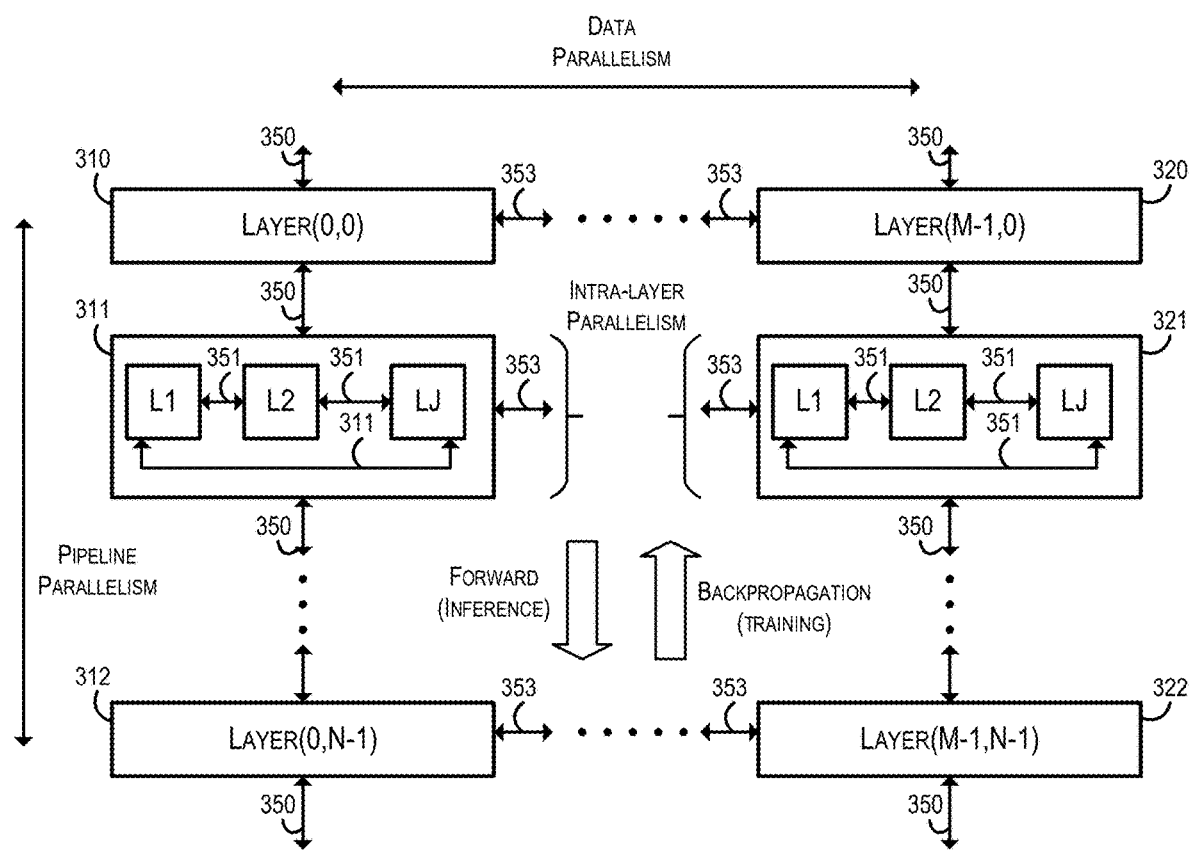
FIG. 3 illustrates neural network communications across three axes.

FIG. 3 illustrates neural network communications across three axes. In this example, a neural network model is partitioned for layer parallelism, pipeline parallelism, and data parallelism. Layer parallelism and pipeline parallelism are described above in FIG. 2. Data parallelism may exchange data between multiple instances of the model executing on different processors. For instance, the same model may be trained in parallel by executing different instances of the model on different processors and periodically synchronizing weights in the various layers.

In this example, M (an integer) instances of the model receive inputs on layers (0,0)-(M−1,0) and produce an output on layers (0,N−1)-(M−1,N−1) during inference. For training, the data flows in the reverse direction. Accordingly, pipeline communications flow vertically as illustrated by arrows 350 (e.g., activations/errors). Layers 311 and 321 may be partitioned to run on different processors as described above, for example. Here, intra-layer communications between J (an integer) processors are illustrated by arrows 351, where layers 311 and 321 are divided into J partitions, for example. Similarly, during training, weights in each of the models may be periodically synchronized as mentioned above. If instances of the neural network models are running on different processors (or distributed across multiple sets of different processors), then such processors may perform communications to update the weights (e.g., using an All-Reduce algorithm, such as a 1 dimensional ring, multiple rings, a tree based algorithm, or a hierarchical algorithm). Pipelines may operate independently during training but may need to synchronize their weights periodically across execution of different instances of the model. For instance, during an All Reduce, the weights may be averaged layer by layer between instances. Accordingly, in some applications each layer of the pipeline may perform an All Reduce periodically with other instances of the model as illustrated in FIG. 3 by arrows 353. Instances of models running in parallel may be configured in a ring, for example, where weight updates between the models may flow in both directions around the ring.

From FIGS. 2 and 3, three forms of parallelism emerge: data parallelism (e.g., sum, average, all reduce), pipeline parallelism, and intra-layer (or just, "layer") parallelism. These forms of potential parallelism allow for the development of an architecture that exploits one or more of the available parallelisms when performing neural network computations. Various embodiments of the present disclosure leverage an insight that the communication dependencies in all three dimensions (intra-layer, pipeline, data) can, with certain exceptions, be mapped (e.g., without congestion) to communication patterns following coupled one-dimensional ring structures. Thus, if the communication pattern is mapped to a network topology, it may be modeled as sets of Hamiltonian cycles connecting each dimension. In some example embodiments, sequences of processors may be arranged logically in a three-dimensional Cartesian space. Accordingly, as described in more detail below, a Hamiltonian cycle may refer to configuring a plurality of processors in series across one or more processor groups through at least one network switch for intra-layer parallelism, pipeline parallelism, data parallelism, or various combinations thereof, for example.

Figure 4:
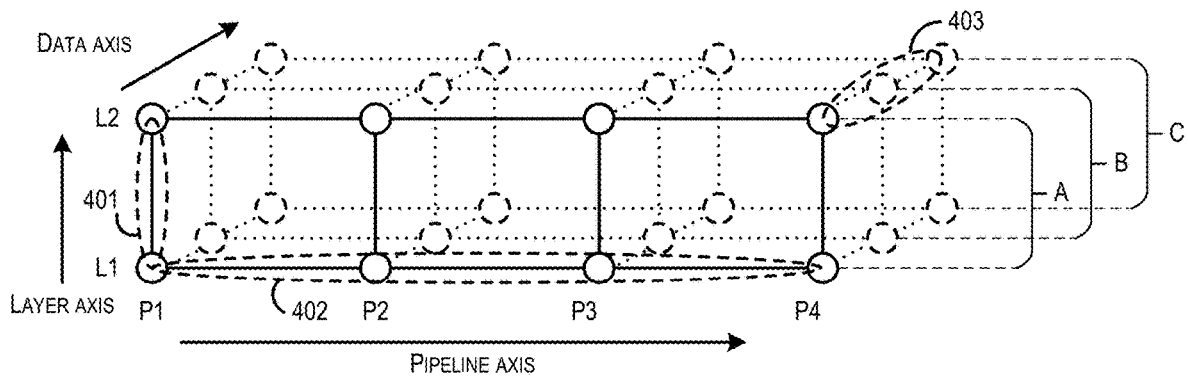
FIG. 4 illustrates the neural network of FIG. 2 partitioned along three dimensions according to an embodiment.

For instance, FIG. 4 illustrates the neural network of FIG. 2 partitioned along three dimensions: layers (L), pipeline stages (P), and data. In this example, model 200 is processed 3 times in parallel using instances A, B, and C (data parallelism). Partitions of model 200 may be mapped to processing sequences illustrated in FIG. 4. For example, computations for the network partition L1,P1 and L1,P2 may be performed on different processors configured in sequence to form a Hamiltonian cycle 401. Similarly, computations for pipeline stages P1-P2-P3-P4 may be performed on a sequence on multiple processors to form a Hamiltonian cycle 402. Finally, computations along the data axis A-B-C (e.g., All-Reductions) may be performed on a sequence of multiple processors forming a Hamiltonian cycle 403, for example. It is to be understood that in various example embodiments, neural networks may be partitioned along the data axis, the pipeline axis, the layer axis, or combinations of thereof. For example, processors may be configured to form a sequence, and the processors may be configured to process a plurality of partial layers of the partitioned neural network, one or more pipelines of the partitioned neural network, data parallelism between models of a neural network (e.g., an All-Reduce), and/or combinations thereof.

Figure 5:
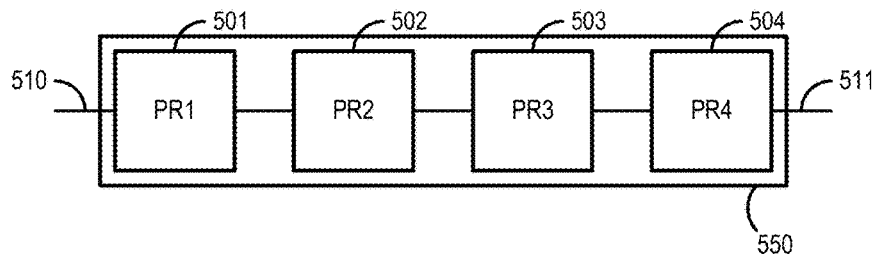
FIG. 5 illustrates an example of a plurality of processors configurable to form sequences according to an embodiment.

FIG. 5 illustrates an example of a plurality of processors configurable to form sequences according to an embodiment. In this example, four (4) processors PR1 501, PR2 502, PR3 503, and PR4 504 are configured in series to form a 1-dimensional (1D) array. Processors 501-504 may form a processor group 550, for example, and processors 501-504 may be configured to process a partitioned neural network as a sequence. Various embodiments of the present disclosure may use a variety of processor types, including but not limited to x86 architecture processors, ARM architecture processors, graphics processors (e.g., GPUs), or application specific artificial intelligence (AI) processors optimized for performing neural network computations, for example.

Here, the processor group 550 includes edge processors 501 and 504 having edge ports 510 and 511. In this example, edge (or boundary) processor 501 in a first position in the array and is coupled to port 510 and processor 502, processor 502 is coupled to adjacent processor 501 and adjacent processor 503, processor 503 is coupled to adjacent processor 502 and adjacent processor 504, and edge (or boundary) processor 504 in a last position is coupled to adjacent processor 503 and edge port 511. Edge ports 510 and 511 may be coupled to a network switch, for example, so that multiple processor groups 550 may be coupled together to form longer sequences to process more partitions of a neural network.

Figure 6:
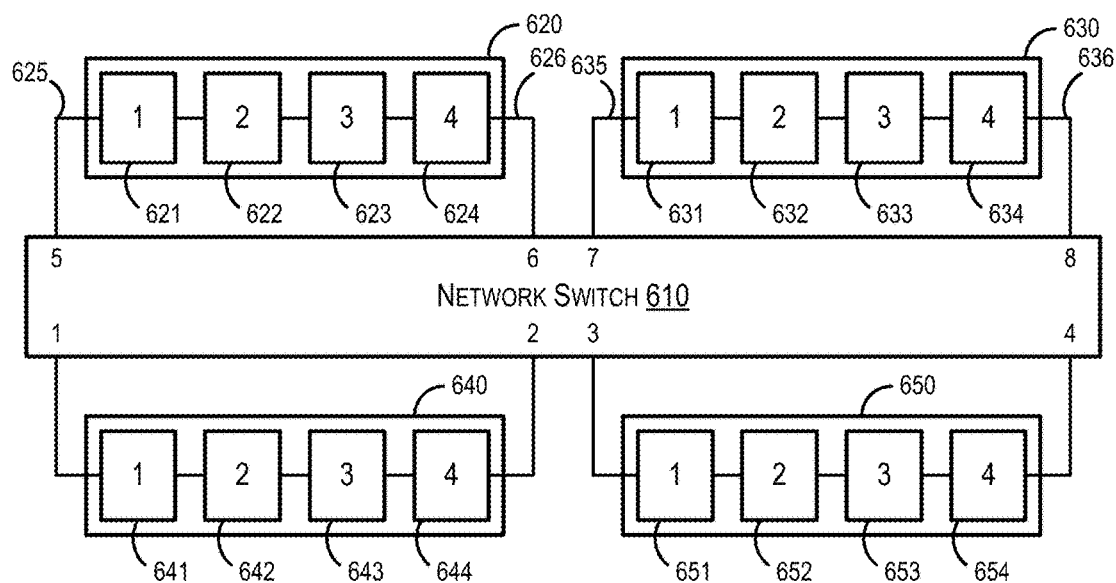
FIG. 6 illustrates an example network switch coupled to a plurality of processor groups according to an embodiment.

FIG. 6 illustrates an example network switch 610 coupled to a plurality of processor groups according to an embodiment. The network switch is configurable to form a sequence across one or more of the processor groups to perform neural network computations. In this simple illustrative example, four (4) processor groups 620, 630, 640, and 650 each comprise four (4) processors configured in a 1D array. Each group comprises edge ports coupled to ports of network switch 610 so that different groups may be coupled together to form longer sequences. For example, if a network is partitioned along any one of the three axes (e.g., layer, pipeline, data), the partitions may be loaded into sequential processors, such as processors 621-624 in processor group 620. In some embodiments sequences may form a closed loop, for example, such that processor 624 communicates with 621. If the partitions are such that longer sequences of processors are needed, longer sequences of processors may be configured through switch 610. For example, if between five and eight sequential processors are needed, port 626 from processor 624, which is coupled to port 6 of network switch 610, may be coupled to port 635 from processor 631 of processor group 630, which is coupled to port 7 of network switch 610. Accordingly, sequences of up to 16 processors may be strung together using the topology shown in FIG. 6.

Figure 7:
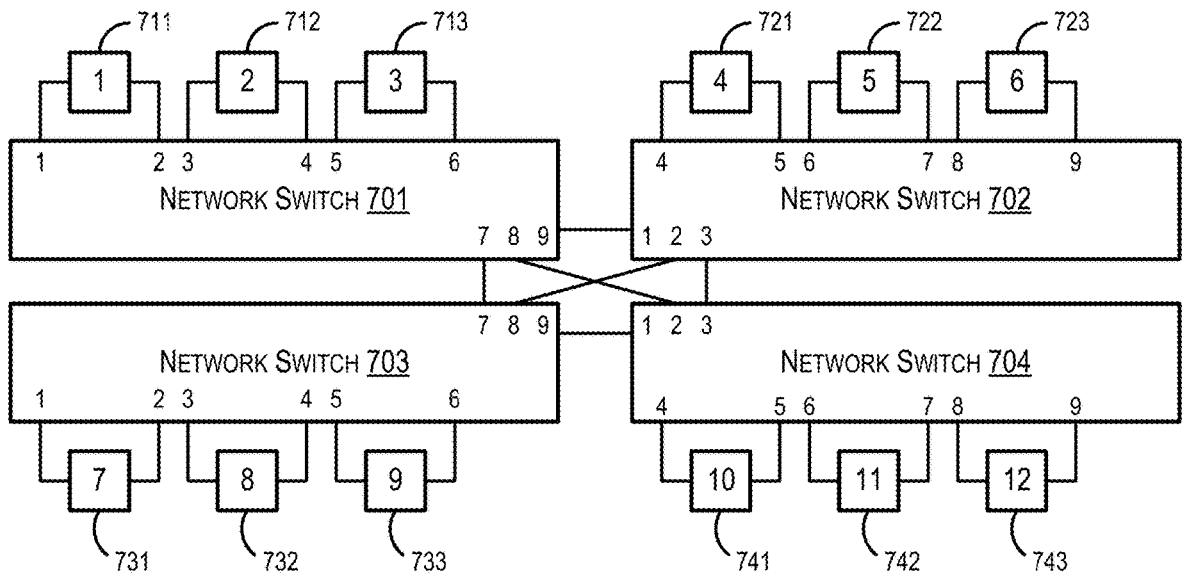
FIG. 7 illustrates another example topology of processor groups and network switches according to an embodiment.

FIG. 7 illustrates another example topology of processor groups and network switches according to an embodiment. In this example, three (3) processor groups 711-713 are coupled to network switch 701, three (3) processor groups 721-723 are coupled to network switch 702, three (3) processor groups 731-733 are coupled to network switch 703, and three (3) processor groups 741-743 are coupled to network switch 704. Each of the processor groups 711-713, 721-723, 731-733, and 741-743 may comprise a plurality of processors configurable as a sequence such as shown in FIG. 5, for example. In this example, a larger number of sequences of processors may be obtained through network switches 701-704, which are directly coupled together. For example, if each processor group comprises five (5) processors, then a sequence of twenty (20) processors may be obtained by coupling groups 711-713 with group 721. In this case, switch 701 is configured to connect ports 7 and 1, ports 2 and 3, ports 4 and 5, and ports 6 and 9, and switch 702 is configured to connect ports 1 and 4 and ports 5 and 2. Ports 5/2 of switch 702 may be routed back to ports 1/7 on switch 701 via switch 703, which may connect ports 7 and 8, for example, to close the ring for a dedicated uncongested nearest neighbor processor communication loop. Using the topology shown in FIG. 7, up to sixty (60) processors may be configured in a sequence to perform neural network computations along one of the three axes described above, for example.

Figure 8:
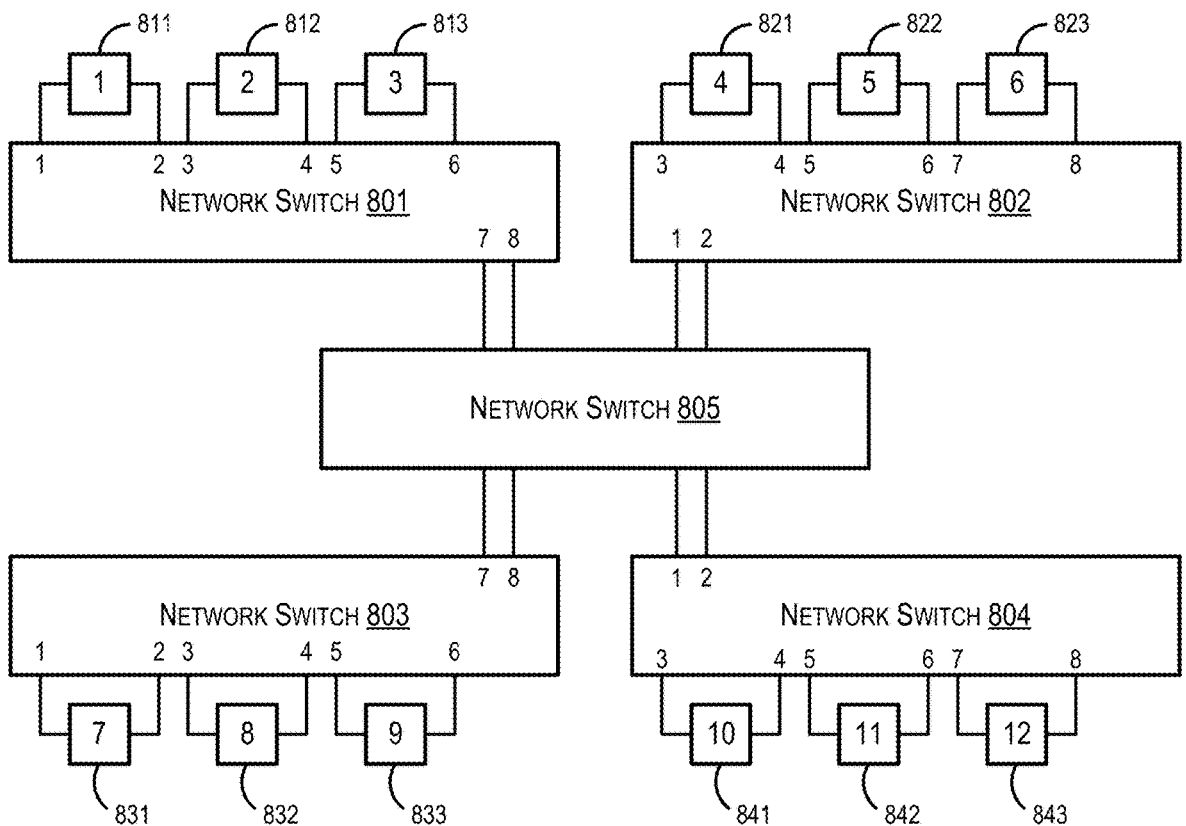
FIG. 8 illustrates yet another example topology of processor groups and network switches according to an embodiment.

FIG. 8 illustrates another example topology of processor groups and network switches according to an embodiment. In this example, network switches 801-804 are coupled together through an intermediate (aka core or tier-1) network switch 805. Accordingly, one or more processor groups 811-813 may be configured to form a sequence with any one or more other processor groups 821-823, 831-833, and/or 841-843 through the directly connected (aka tier-0) switches 801-804 and through intermediate network switch 805, for example.

Figure 9:
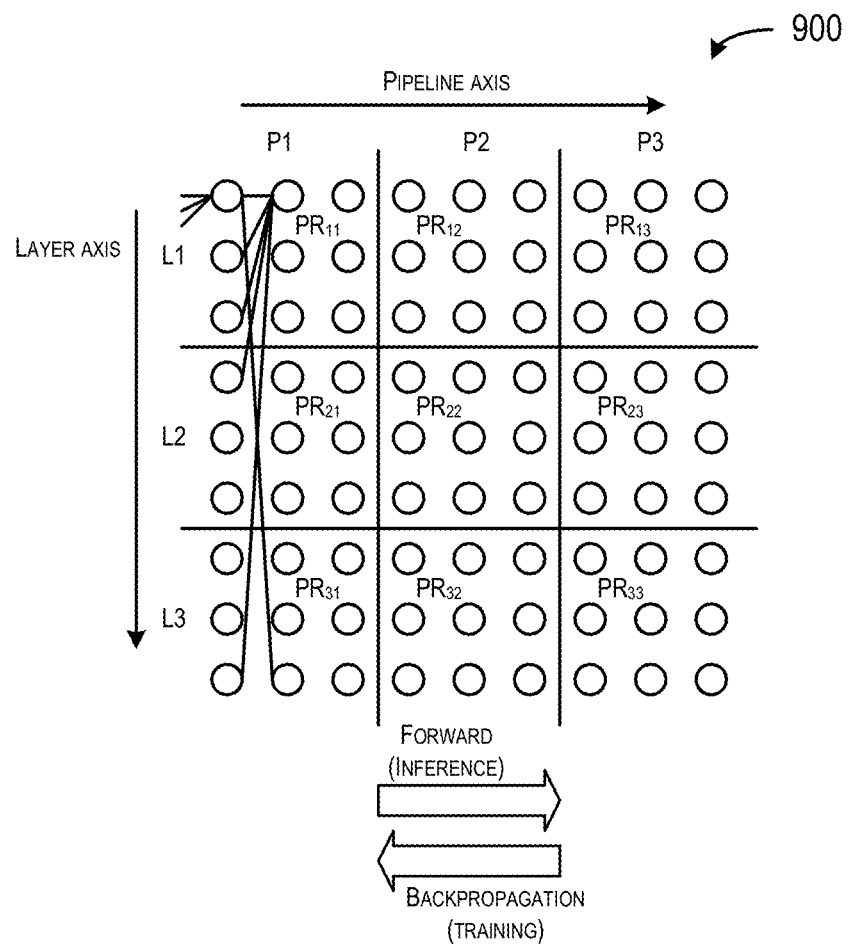
FIG. 9 illustrates another example neural network partitioned according to an embodiment.

FIG. 9 illustrates another example neural network 900 partitioned according to an embodiment. Neural network 900 comprises a pipeline of nine (9) layers each comprising nine (9) nodes. Most of the edges are omitted for clarity, but it is to be understood that edges couple the nodes together. In this illustrative example, network 900 is partitioned across both the layer axis (e.g., L1, L2, L3) and the pipeline axis (e.g., P1, P2, P3), with computations for each partition being performed on different processors (e.g., PR11-PR33).

Figure 10:
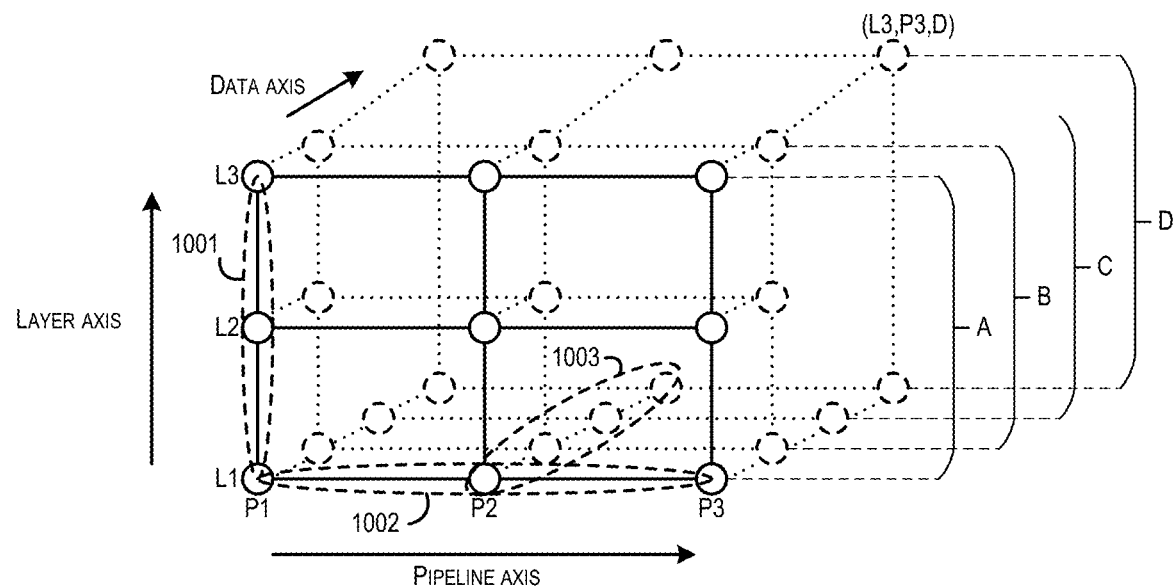
FIG. 10 illustrates a 3-dimensional representation of partitions to illustrate nearest neighbor communications of the processors according to an embodiment.

FIG. 10 illustrates a 3-dimensional representation of the partitions to illustrate sequential communications of the processors. In this example, computations for each partition may be performed on processors PR11-PR33 (see FIGS. 9 and 11), which form a 3×3 array. Additionally, each model may be executed four (4) times (e.g., data parallelism A, B, C, D) to form a 3-dimensional 3×3×4 array. Embodiments of the present disclosure may map neural network partitions to an array of processors for execution, where the processors are configured to execute Hamiltonian cycles, for example. In this example, along the layer axis, a Hamiltonian cycle may capture communications between L1, L2, and L3 in performing computations for the first layer of pipeline, P1, as illustrated at 1001. Along the pipeline axis, the L1 layers computed during P1 may communicate with L1 layers computed during P2, and subsequently the layers of L1 during P3 to form another Hamiltonian cycle as illustrated at 1002. Along the data axis, a Hamiltonian cycle may capture communications between layers across execution of multiple models A-D (e.g., to perform All Reduce operations to adjust the weights of each model), as illustrated at 1003.

Figure 11:
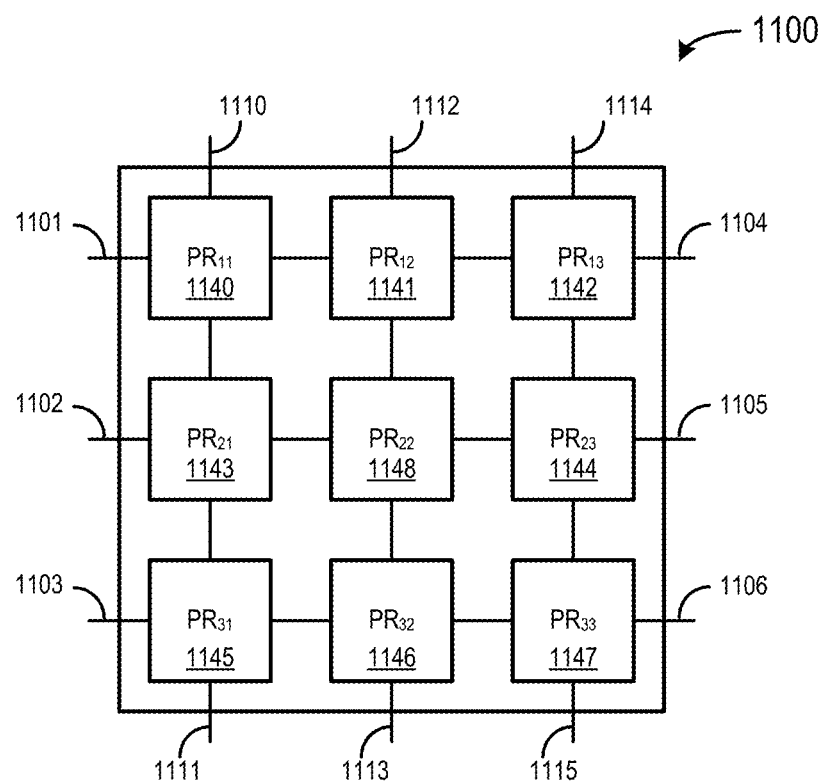
FIG. 11 illustrates another configuration of processors in a processor group according to an embodiment.

FIG. 11 illustrates another configuration of processors in a processor group 1100 according to an embodiment. In this example, processors 1140-1148 are configured as rows and columns to form a 2-dimensional processor array. Here, the 2-dimensional processor array (e.g., PR11-PR33) is configured as a 3×3 matrix to form a processor group 1100, where processors 1140-1148 are coupled to nearest neighbor processors in the N-dimensional processor array to support forming sequences of processor to execute Hamiltonian cycles, for example. Processor group 1100 includes edge processors 1140-1147 each having one or more edge ports. Ports 1101-1106 are coupled to rows of processors in processor group 1100 and ports 1110-1115 couple to columns of processors in processor group 1100. Accordingly, each partition of neural network 900 of FIG. 9 may be loaded into different processors for performing neural network computations for the layers and pipelines of network 900, where layers of each pipeline stage may be computed first, and then each successive pipeline stage computed. Intra-layer data for computing each layer may flow vertically across columns of processors (e.g., PR11-PR21-PR31). As the layers in each partitioned pipeline stage P1, P2, P3 are completed, results flow horizontally across the rows of processors (e.g., PR11-PR12-PR13).

Figure 12:
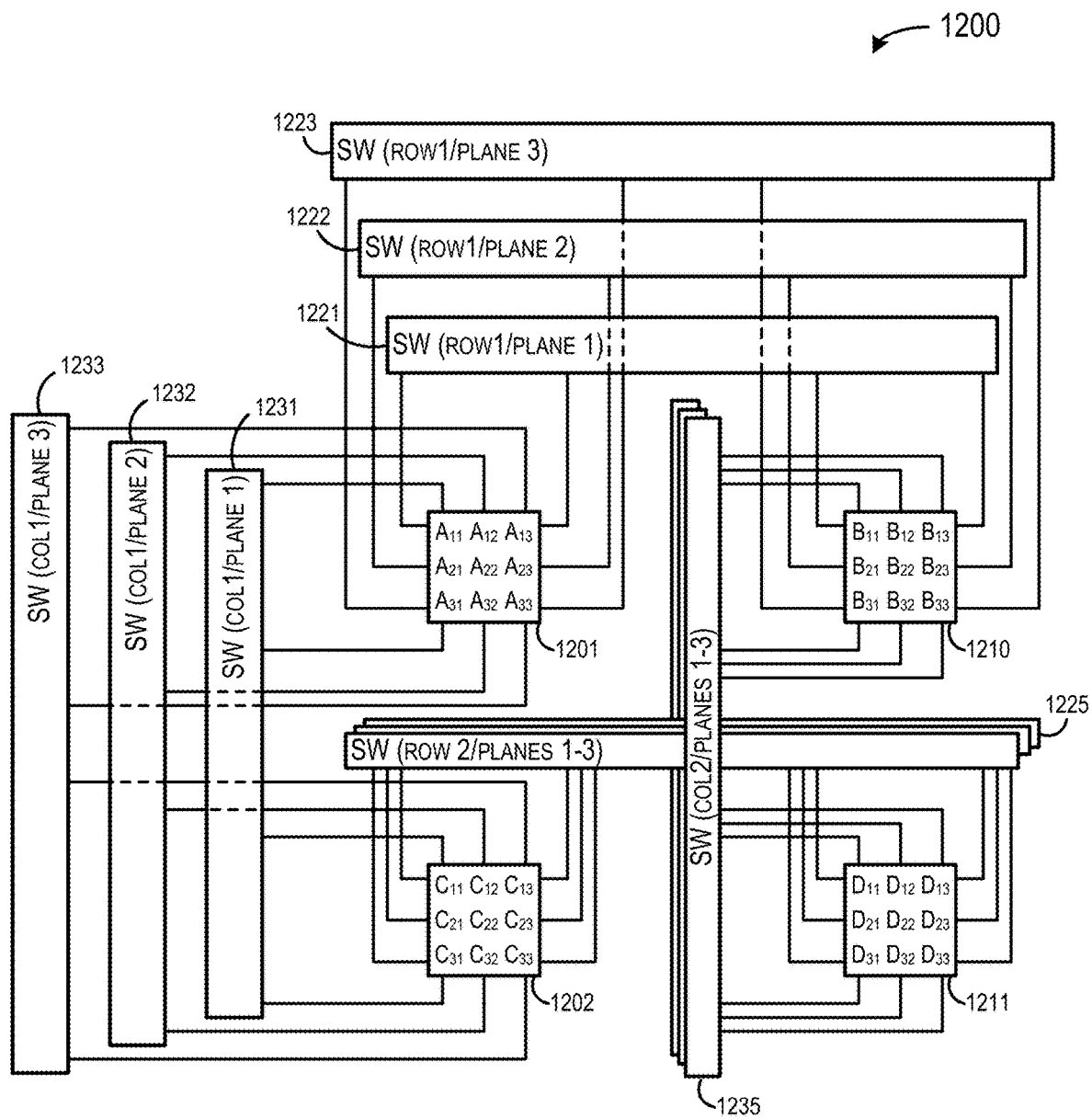
FIG. 12 illustrates a configuration for a cluster of multi-dimensional processor groups according to an embodiment.

FIG. 12 illustrates a configuration for a multi-dimensional cluster array 1200 of processor groups according to an embodiment. In this example, a 2-dimensional cluster 1200 of processor groups 1201, 1202, 1210, and 1211 may be used to support a larger neural networks, more partitions, or the partitions mentioned above and further multiple executions of model 900 by processor groups that may be combined via an All Reduce, for example. For instance, larger networks may require more sequences of processors to implement Hamiltonian cycles along each axis. The architecture shown in FIG. 12 allows rows or columns in different processor groups to be configured into larger sequences, for example. In particular, during performance of neural network computations, a first subset of processors (e.g., a row in processor group 1201) and a second subset of processors (e.g., a row in processor group 1210) may be coupled together to form a sequence comprising a string of processors (e.g., A11, A12, A13, B11, B12, B13), where each processor communicates with an adjacent processor in the string of processors. As mentioned above, in various embodiments sequences may form a closed loop, for example, such that A11 communicates with B13.

The topology of network switches is configured to couple rows and/or columns of processors between processor groups to produce strings of processors for performing neural network computations. In various embodiments disclosed herein, processor groups along a particular dimension of a cluster array have edge processor ports coupled to corresponding same dimension network switches. In this example, processors in a first position and a last position along each dimension are coupled to a row or column network switch. For example, processor group 1201 includes a row of processors A11, A12, A13, where edge processor ports of A11 and A13 are coupled to row network switch 1221. Additionally, processor group 1210 includes a row of processors B11, B12, B13, where edge processor ports of B11 and B13 are coupled to row network switch 1221. Similarly, processor group 1201 includes a row of processors A21, A22, A23, where edge processor ports of A21 and A23 are coupled to row network switch 1222, and processor group 1210 includes a row of processors B21, B22, B23, where edge processor ports of B21 and B23 are coupled to row network switch 1222. The third row of processors in groups 1201 and 1210 are likewise coupled to row network switch 1223, for example. Accordingly, row switches 1221-1223 form switching layers corresponding to rows of processors in each processor group that may be used to connect particular rows of processors across a plurality of switching groups, for example.

Columns of processors in each processor group 1201 and 1202 may be similarly coupled together across the first column of cluster 1200. As describe in the example above for rows, edge processor ports on opposite sides of a column of processors A11, A21, A31 and C11, C21, C31 across processor groups 1201 and 1202 may be coupled to column network switch 1231. Other columns of processors Ax2/Cx2 and Ax3/Cx3 (x=1 . . . 3) may be coupled from edge processor ports to column network switches 1232 and 1233, respectively, for example. Accordingly, column switches 1231-1233 form switching layers corresponding to columns of processors in each processor group that may be used to connect particular columns of processors across a plurality of switching groups.

Likewise, a second row of cluster 1200 comprising processor groups 1202 and 1211 may be coupled to multiple row network switches 1225 as described above for the first row of the cluster. Finally, a second column of cluster 1200 comprising processor groups 1210 and 1211 may be coupled to multiple column network switches 1235 as described above for the first column of the cluster. As described in more detail below, a plurality of intermediate switches may be used to link the row and column switches to allow more processors to be configured in strings to compute longer Hamiltonian cycles, for example.

While the above examples illustrated in FIGS. 9-12 show an example neural network partitioned to fit into a processor group, different networks may be partitioned in a variety of ways to run on a network topology according to the present disclosure. While various partitions may more efficiently use available resources in a given topology, there is otherwise no strict relation between the network partitions that may be employed for a given number of processors in a group or given number of groups in a cluster, for example. For instance, each processor may perform computations for one layer, multiple layers, or a partial layer of a neural network model. Similarly, each processor may perform computations for one pipeline stage, multiple pipeline stages, or a portion of a pipeline stage. Finally, each processor may perform computations for a full neural network model (all layers and all pipelines) and synchronize weights across processors, or multiple sets of processors performing operations on a partitioned neural network may synchronize weights, for example.

Figure 13:
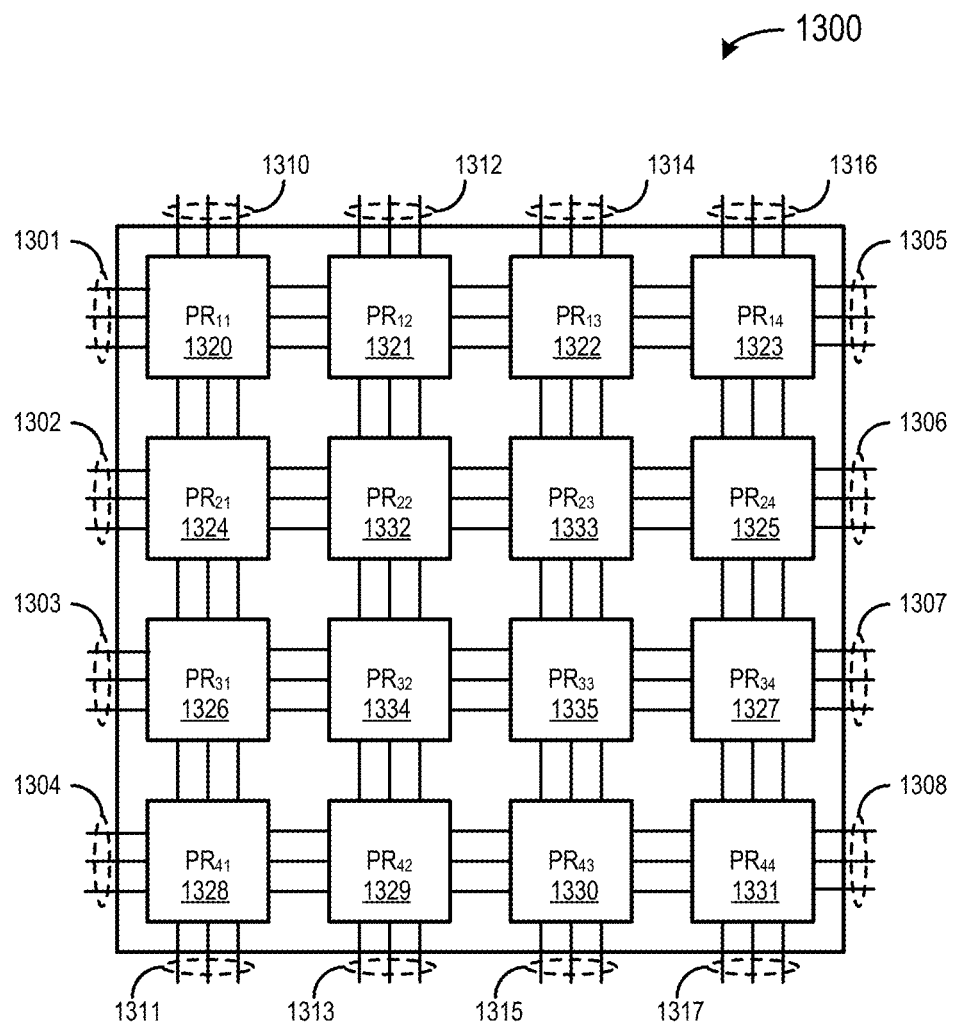
FIG. 13 illustrates an example processor group according to another embodiment.

FIG. 13 illustrates an example processor group 1300 according to another embodiment. In this example, a 4×4 array of processors, PR11 . . . PR44, is arranged to form processor group 1300. Here, each processor has 12 input/output (I/O) communications ports, which may be Ethernet ports (e.g., 50 Gbps Ethernet) configured in parallel to extend the bandwidth of the connections, for example. Three (3) I/O ports are coupled to either an adjacent (e.g., nearest neighbor) processor or to a network switch as described in more detail below. Processor group 1300 includes edge processors 1320-1331 having edge processor ports 1301-1308 and 1310-1317, which couple each edge processor to a particular network switch, for example.

Figure 14:
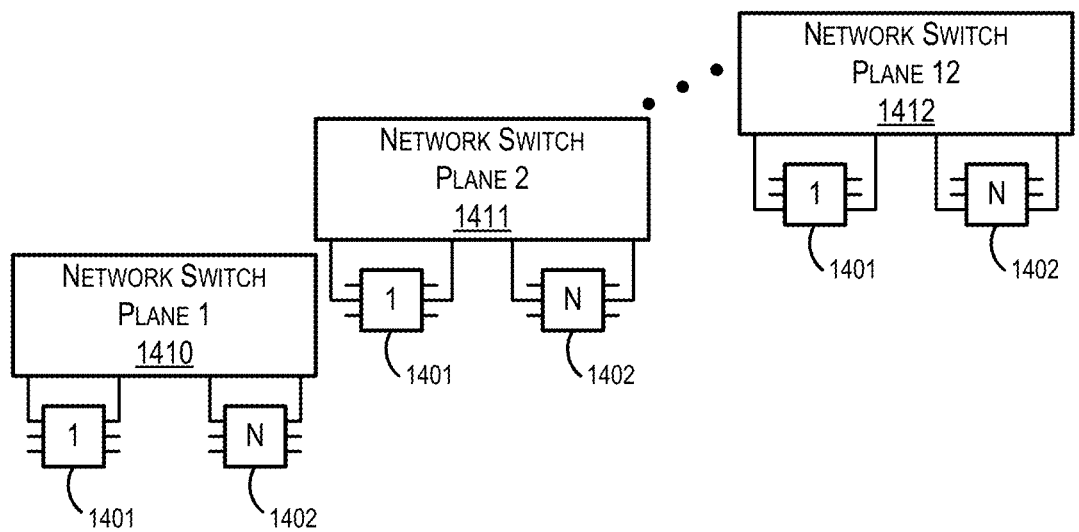
FIG. 14 illustrates example network switches and processing groups according to another embodiment.

FIG. 14 illustrates example network switches and processing groups according to another embodiment. In this example, N processing groups 1401-1402 are coupled to a plurality of switches 1410-1412 configured in 12 switching planes, where N is an integer. For example, N may be 24 groups of 4×4 processor arrays of FIG. 13. As mentioned above, each processor group may have rows and columns. Each row may have 3 edge processor ports, for example, for a total of 24 row processor ports (3 ports for each of the 4 rows (×4) on each side of the row (×2); 3×4×2=24). In this example, edge processor ports on opposite sides of a row of processors across a first plurality of processor groups are coupled to a row network switch. For example, edge processor ports on opposite sides of the first row of processors in processor groups 1401-1402 are coupled to network switch 1410. Similarly, edge processor ports on opposite sides of the second row of processors in processor groups 1401-1402 are coupled to network switch 1411, and edge processor ports on opposite sides of the last row of processors in processor groups 1401-1402 are coupled to network switch 1412. In the present figure only 3 ports are shown for illustrative purposes, but it is to be understood that there are 3 ports for each row and column as illustrated in the example shown in FIG. 13. Accordingly, in this example, there are 12 switching planes to connect 4 rows of switches across 24 processor groups. Likewise, for the 4 columns in each of the 24 processor groups, for example, edge processor ports on opposite sides of a column of processors across a second plurality of processor groups are coupled to a column network switch. Accordingly, there are 12 network switches for coupling columns of the processors in each of the 24 processor groups in substantially the same way as illustrated in FIG. 14 for rows, for example.

Figure 15:
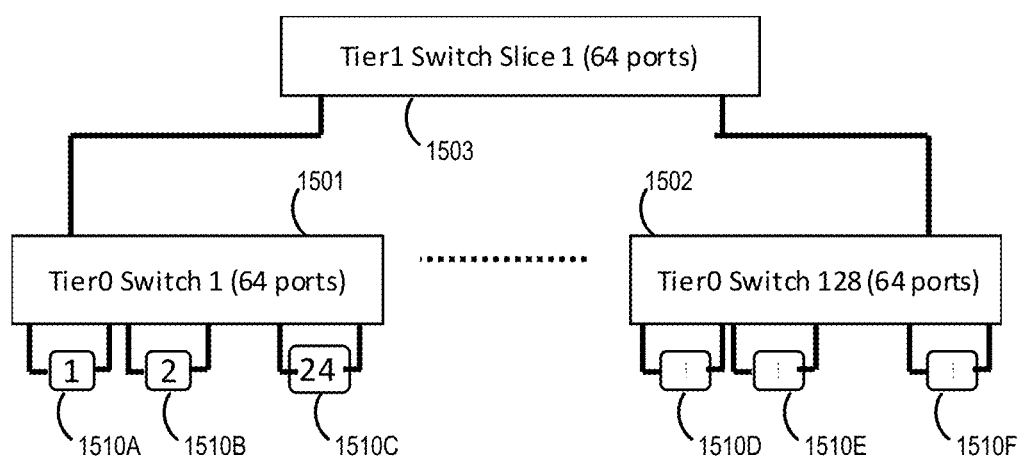
FIG. 15 illustrates a 2-tier arrangement of network switches according to an embodiment.

FIG. 15 illustrates a 2-tier arrangement of network switches according to an embodiment. Features and advantages of the present disclosure include topologies that allow subsets of processor groups to be coupled together across different network switches (e.g., to form Hamiltonian cycles). In this example, tier-0 network switch 1501 is coupled to processor groups 1510A-C and tier-0 network switch 1502 is coupled to processor groups 1510D-F. Switches 1501 and 1502 are further coupled to tier-1 intermediate network switch 1503. Each connection between tier-0 and tier-1 switches may include two links (e.g., two ports)—one for uncongested data uplinks and another for uncongested data downlinks, for example. The topology shown in FIG. 15 may, for example, be applied to one switching plane of FIG. 14. Similar topologies may be used for the other switching planes, for example. In some configurations, a subset of processor groups are coupled together by a tier-0 switch. In other configurations, intermediate tier-1 switch 1503 may be used to couple a plurality of tier-0 switches together to form sequences of processors longer than can be supported by any particular tier-0 switch. For example, if a sequence of 150 processors is needed, then processor groups from two switches may be combined (e.g., 24 groups×4 processors/group×2>150). Longer sequences can be produced by coupling tier-0 switches and associated processor groups together in series, which may form an uncongested loop across multiple tier-0 switches and a tier-1 switch, for example.

Switches 1501 and 1502 may be 64 port switches, for example. Thus, in this example, 48 ports are used for processor group connections, which leaves 16 ports to support inter-switch transfers for 24 groups. Since many more switch ports are used for local connections and only 16 available for inter-switch transfers, the tier-0 switches in this example topology are referred to as over-subscribed (e.g., all the processor groups are not able to access the tier-1 switch at the same time). Another advantage of some example implementations is that network switches may be over-subscribed without impacting performance because processor groups may be configured locally as a sequence before multiple switches are required. For instance, one port of processor group 1510A may be coupled to a port of processor group 1510B, another port of processor group 1510B may be coupled through additional ports and processors to a port of processor group 1510C, and a second port of processor group 1510C may be coupled back to the other port of processor group 1510A (e.g., to form a closed loop) or through a link to switch 1503 to other tier-0 switches and processing groups, for example. Because the processor groups may often be configured to form local sequences, there are typically still enough ports in an oversubscribed switch to establish communications with other processor groups in other switches to perform the computations desired.

Figure 16:
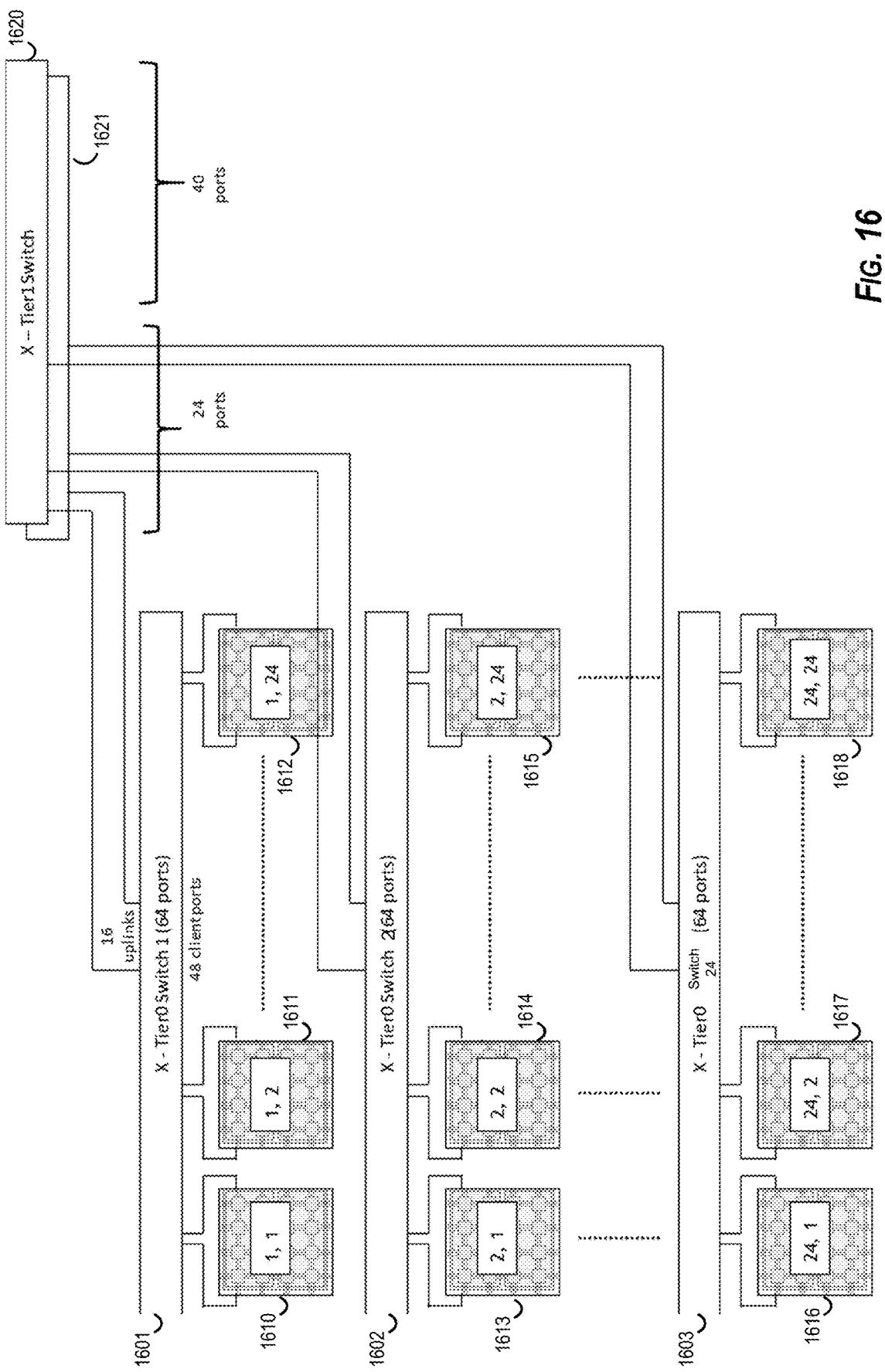
FIG. 16 illustrates an example topology for a cluster of processing groups along a first cluster dimension according to an embodiment.

FIG. 16 illustrates an example topology for a cluster of processing groups along a first cluster dimension according to an embodiment. In this example, a cluster comprises an N×M 2-dimensional array (e.g., 24×24) of processor groups coupled together through a 2-tier switching topology. FIG. 16 illustrates one switching plane (e.g., a switching topology for one edge port for a row in each processor group). Other planes for other edge ports in other rows may have substantially similar implementations. In this topology, rows of processor groups in the cluster have edge processor ports coupled to corresponding same row network switches. For example, processor groups 1610-1612 (e.g., processor groups in the first row of the cluster) have edge processor ports (e.g., 2 for each group) coupled to the same row network switch (e.g., network switch 1601 for cluster row 1). Similarly, processor groups 1613-1615 in the second row of the cluster are coupled to row network switch 1602, and processor groups 1616-1618 in the last row of the cluster are coupled to row network switch 1603, for example.

Row network switches 1601-1603 for the cluster may be coupled together through one or more intermediate tier-1 row network switches 1620-1621. In this example, each row network switch 1601-1603 comprises a plurality of connections to a plurality of intermediate row network switches. For instance, row network switches 1601-1603 may all include connections to both intermediate row switches 1620-1621. Accordingly, each row of processor groups may establish a channel to one or more other rows of processor groups through intermediate row switch 1620 or intermediate row switch 1621 to create one or more Hamiltonian cycles across multiple rows, for example. In this example, the links between Tier0 and Tier1 may be single full-duplex Ethernet links for up and down traffic without congestion. Even longer Hamiltonian cycles may be obtained by connecting additional clusters to tier-1 switches 1620 and/or 1621, for example, using the remaining 40 ports. In some embodiments, intermediate row network switches may be coupled to intermediate column network switches as described below.

Figure 17:
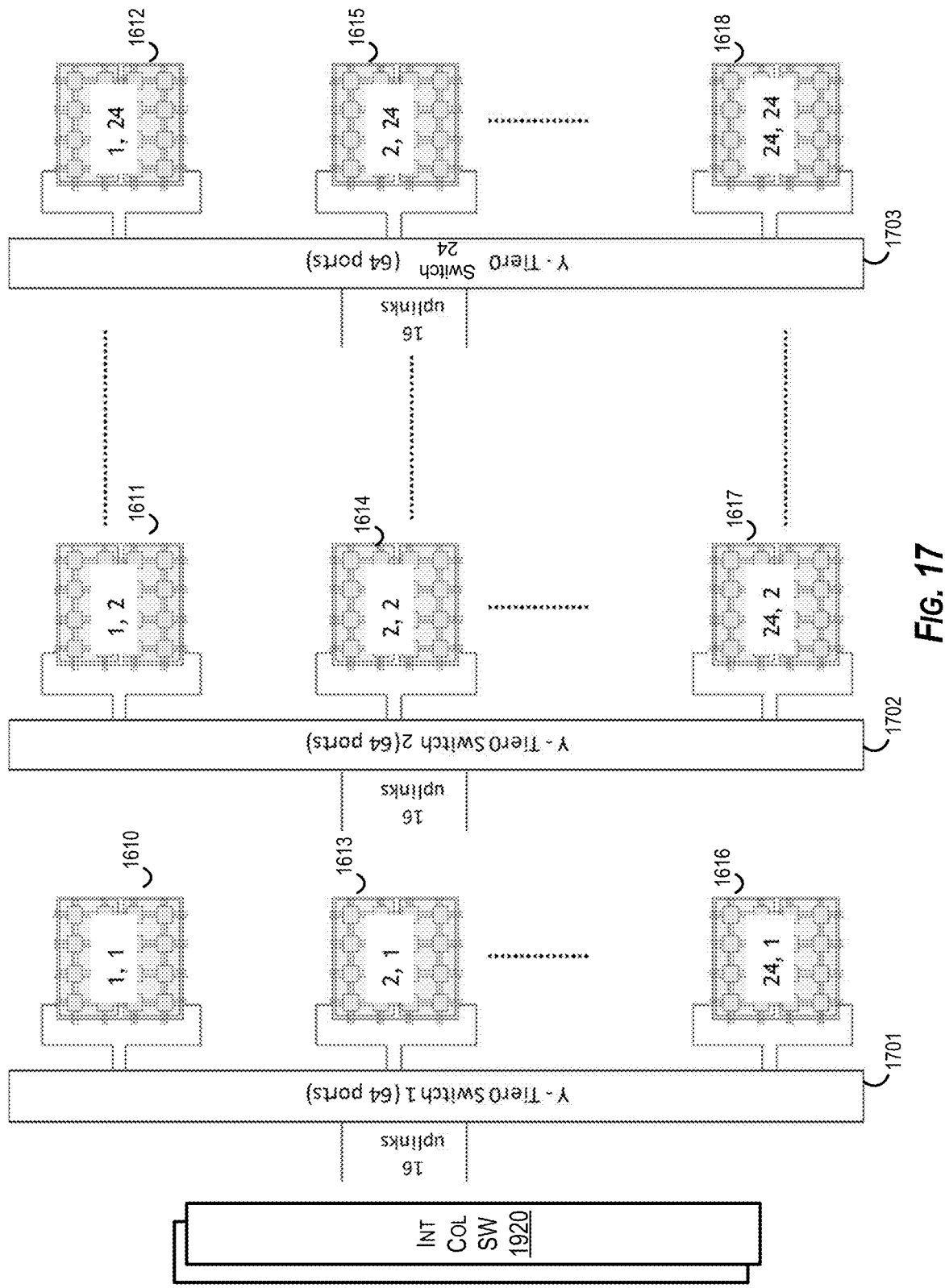
FIG. 17 illustrates an example topology for a cluster of processing groups along a second cluster dimension according to an embodiment.

FIG. 17 illustrates an example topology for cluster of processing groups along a second cluster dimension according to an embodiment. In this topology, columns of processor groups in the cluster have edge processor ports coupled to corresponding same column network switches. For example, processor groups 1610, 1613, and 1616 (e.g., processor groups in the first column of the cluster) have edge processor ports coupled to the same column network switch (e.g., network switch 1701 for cluster column 1). Similarly, processor groups 1611, 1614, and 1617 in the second column of the cluster are coupled to column network switch 1702, and processor groups 1612, 1615, and 1618 in the last column of the cluster are coupled to column network switch 1703, for example. Column switches 1701-1703 may be coupled to intermediate tier-1 column switches 1920 substantially as shown in FIG. 16, for example.

Figure 18:
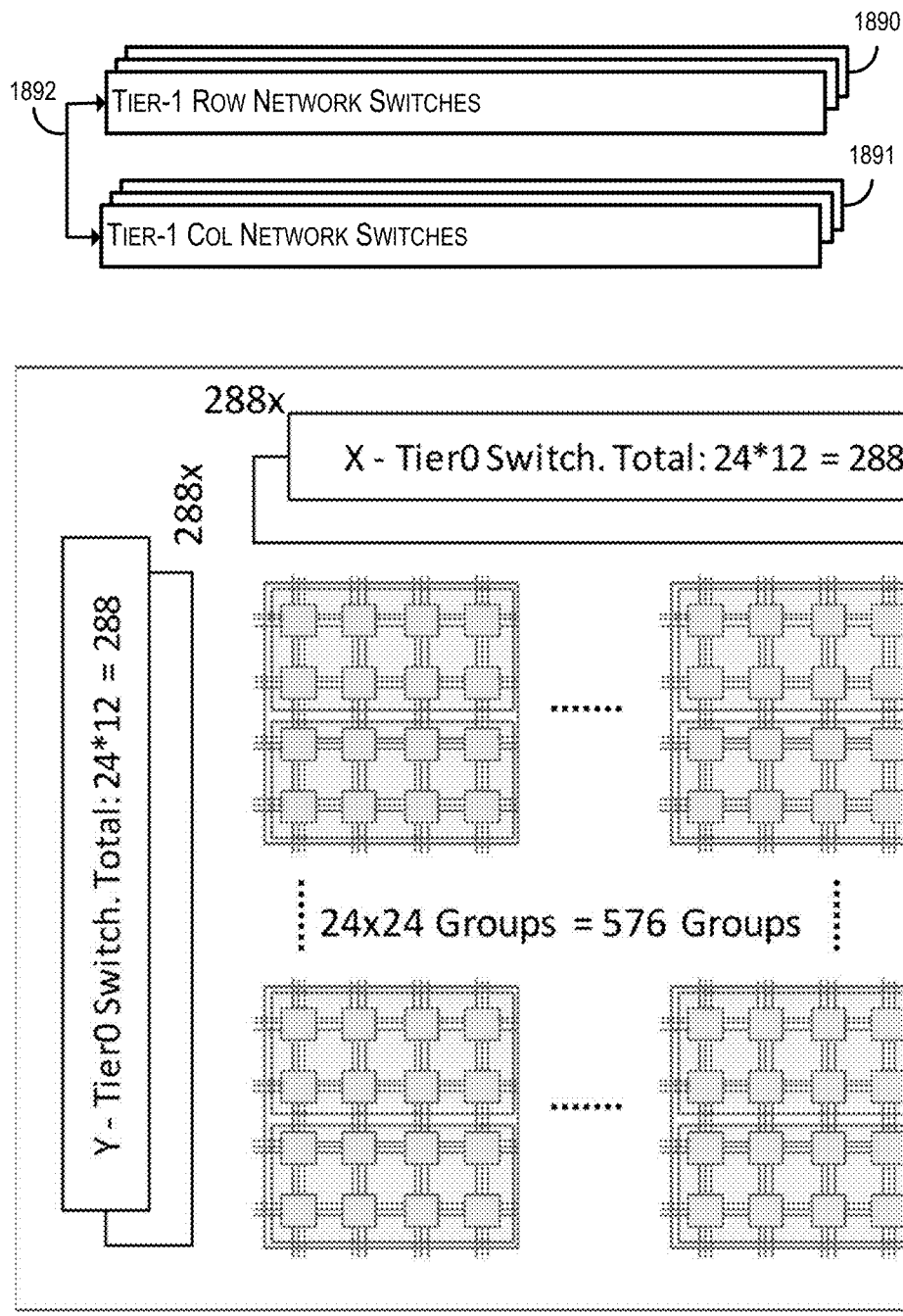
FIG. 18 illustrates an example 2-dimensional cluster topology according to an embodiment.

FIG. 18 illustrates another example multi-dimensional cluster array according to an embodiment. The topologies of FIGS. 16 and 17 may be combined to form a 2-dimensional cluster switching topology as illustrated in FIG. 18. For all switching planes, 12 row network switches may be used for each row (e.g., 12 switches/row×24 rows=288 row network switches) and 12 column network switches may be used for each column (e.g., 12 switches/column×24 columns=288 column network switches). Tier-1 intermediate row network switches are shown at 1890, and tier-1 intermediate column switches are shown at 1891. In certain embodiments, processor groups in various columns and rows may be cross coupled together indirectly through intermediate row and column network switches as illustrated at 1892, for example. In the embodiment shown in FIG. 18, each switching plane includes 2 Tier-1 switches for both columns and rows, and there are 12 switching planes (12 edge row ports and 12 edge column ports) and thus a total of 12 planes×2 tier-1 SW/plane×2 (columns and rows)=48 Tier-1 switches.

For the example configuration illustrated in FIG. 18, there are 24×24 Groups (9216 processors) and 24 planes (e.g., 12 rows and 12 columns). For each plane there are 24 Tier0 switches each having 16 uplinks. Each uplink connects to a Tier1 switch. In one example embodiment, 64 port switches may be used. Thus, 8 Tier1 switches may be used (e.g., and then 16 ports of each Tier1 switch may not be used), which results in a total of 24 planes*8 Tier1 switches=192 Switches, for example.

While an example topology is shown in FIGS. 13-18, it is to be understood that these figures are merely illustrative. A variety of different numbers of processors may be used in different processor groups, a variety of different subsets of groups may be coupled to network switches, and a variety of different cluster sizes and configurations may be used in various embodiments of the present disclosure. Furthermore, for any particular hardware topology (e.g., number of processors in a processor group, number of processor groups to a switch, and/or number of processor groups in a cluster), a variety of neural network sizes and partitions may be computed using any particular topology, such as the topology shown in FIGS. 13-18. For example, for a given hardware configuration, smaller or larger neural networks may be computed that may fit in the topology in different ways. A particular hardware topology may process neural networks with different numbers of layers, different partitions of layers, different numbers of pipeline stages, different partitions of pipeline stages, and different amounts of data parallelism, for example. In various embodiments, different sized network models may be mapped to a wide variety of different processors and sequences of processors in one or more dimensions using the techniques describe herein, for example.

Figure 19:
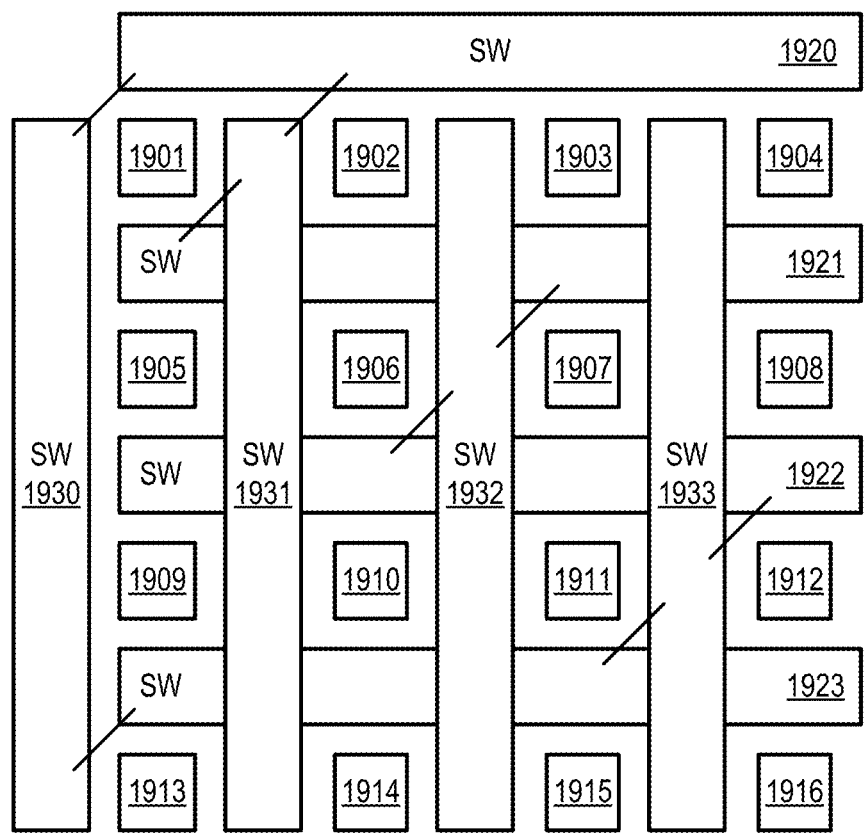
FIG. 19 illustrates another example 2-dimensional cluster topology according to an embodiment.

FIG. 19 illustrates another example 2-dimensional cluster topology according to an embodiment. In some embodiments, intermediate (e.g., tier 1) row network switches and intermediate column network switches in a cluster may be coupled together. In this example, processor groups 1901-1916 are configured in a multi-dimensional (e.g., 2D) cluster array similar to FIGS. 12 and 18, for example, where processor groups 1901-1916 along a particular dimension of the cluster array have edge processor ports coupled to corresponding same dimension network switches. In this example, rows of processor groups 1901-1916 in the cluster array have edge processor ports coupled to corresponding same row network switches 1920-1923, and columns of processor groups in the cluster array have edge processor ports coupled to corresponding same column network switches 1930-1933. Examples of such connections are shown in FIGS. 12 and 18 but are omitted here. In various embodiments, one or more row network switches 1920-1923 may be coupled to one or more column network switches 1930-1933. In this example, row network switch 1920 is coupled to column network switches 1930 and 1931, row network switch 1921 is coupled to column network switches 1931 and 1932, row network switch 1922 is coupled to column network switches 1932 and 1933, and row network switch 1923 is coupled to column network switches 1930 and 1933. This advantageously improves fault tolerance or may support mappings of Hamiltonian cycles across dimensions (e.g., when mapping a sequence of processors together that is larger than a single dimension). As described above, indirect cross dimensional connections may be attached between intermediate (Tier-1) row and column network switches as described above.

Scheduling and Failures

Certain embodiments of the present disclosure may differentiate based on job size (e.g., between small and large jobs). Small jobs may be defined as jobs that fit within a processor group, for example. Such jobs may be scheduled only to a processor group that house other small jobs, for example. Large jobs may spread across multiple processor groups. In such cases, a minimum increment of an allocation may be a single processor group, for example. If the number or geometry of nodes required for a job does not fully fit a multiple of the nodes in a processor group, then nodes may be left unused and simply forward traffic, for example.

Various embodiments may route many configurations of Hamiltonian cycles and replace processor group transparently when failures occur. For example, in 1D configurations, the system may swap an arbitrary processor group in the same switch and any two processor groups if enough uplinks can be reserved for maintaining a sequence across other switches, for example. In higher-dimensional configurations, the system may swap rows and columns (or consecutive blocks) together if enough links are available. This may simplify finding a new processor group in case of a failure or when dealing with a fragmented allocation after some time of operation, for example.

Routing

Once the allocation of logical parts of the network to processor groups and processors is performed, the Hamiltonian cycles may be routed. The cycles may have constant bandwidth guarantees, which reserve at least parts of links for communications between the processors. For example, various embodiments described above for 1-, 2-, or more dimensions may include closed rings of processors with dedicated uncongested nearest neighbor processor communication loops across one or more processor groups and switches. The network may advantageously be optimized for delivering 100% of the link bandwidth to sequences of processors used in the Hamiltonian cycles. The implementation of the bandwidth reservation and routing will depend on the network technology. Simple policy-based routing schemes or more complex schemes basing on ECMP routing may be used for establishing the routes while QoS buffer and bandwidth reservations may be used to guarantee a certain rate.

To route Hamiltonian cycles with a global view of the network, a network manager may allocate available links to a cycle and then mark them as used. The routing may then be programmed to use only those rings. If global traffic is required and links are not available, then a QoS scheme may take some percentage of each Hamiltonian cycle to implement this traffic. If the local topology is longer than two processors in any dimension, then some of the processors may forward global traffic to the interior processors, for example. This could be done with a simplified mechanism because the number of hops in the local topology can be controlled by its size.

The above description illustrates various embodiments of the present disclosure along with examples of how aspects of these embodiments may be implemented. Various embodiments described above may advantageously include a network topology that enables a high oversubscription factor (e.g. 3:1, with 48 client links and 16 uplinks), which means significant cost/power savings, while still being able to sustain full Hamiltonian cycle bandwidth. In some embodiments, a network topology as described herein may include a software allocation/re-allocation method that exploits locality (e.g., allocating neighboring processor groups to the same Tier0 switch, for example. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a plurality of processor groups, the processor groups comprising a plurality of series configured processors to process a partitioned neural network, wherein different processors in the plurality of processor groups process one or more different layers, stages, or model instances of the partitioned neural network; and
a plurality of network switches coupled to subsets of the plurality of processor groups through edge processors of the series configured processors in each processor group,
wherein at least a subset of the processors in the processor groups are configured to form sequences such that each processor communicates data for said layers, stages, or model instances with at least two adjacent processor in the sequence, and
wherein the network switches are configurable to form at least one sequence across one or more of the plurality of processor groups to perform neural network computations.

2. The computer system of claim 1 wherein, during performance of the neural network computations, at least a first subset of processors in a first processor group and at least a second subset of processors in at least a second processor group are coupled together to form a sequence comprising a string of processors, wherein each processor communicates with an adjacent processor in the string of processors.

3. The computer system of claim 1 wherein one or more processor groups comprise processors configured in series to form a 1-dimensional processor array.

4. The computer system of claim 1 wherein one or more processor groups comprise processors configured as rows and columns to form a 2-dimensional processor array.

5. The computer system of claim 1 wherein the plurality of processors in the processor groups are configured in an N-dimensional processor array.

6. The computer system of claim 1 wherein:
edge processor ports on opposite sides of a row of processors across a first plurality of processor groups are coupled to a first network switch; and
edge processor ports on opposite sides of a column of processors across a second plurality of processor groups are coupled to second network switch.

7. The computer system of claim 1 wherein the processor groups are coupled to a plurality of row network switches and a plurality of column network switches across a plurality of switching planes corresponding to rows and columns of processors in each processor group.

8. The computer system of claim 7 wherein one or more of the row network switches are coupled to one or more of the column network switches.

9. The computer system of claim 1 wherein the processor groups are configured in a multi-dimensional cluster array.

10. The computer system of claim 9 wherein processor groups along a particular dimension of the cluster array have edge processor ports coupled to corresponding same dimension network switches.

11. The computer system of claim 10 wherein a plurality of network switches along a particular dimension are coupled together through a plurality of intermediate network switches.

12. The computer system of claim 9 wherein:
rows of processor groups in the cluster array have edge processor ports coupled to corresponding same row network switches, and
columns of processor groups in the cluster array have edge processor ports coupled to corresponding same column network switches.

13. The computer system of claim 12 wherein:
row network switches are coupled together through one or more intermediate row network switches, and
column network switches are coupled together through one or more intermediate column network switches.

14. The computer system of claim 12 wherein one or more intermediate row network switches are coupled to one or more intermediate column network switches.

15. The computer system of claim 1 wherein the plurality of network switches are directly coupled together.

16. The computer system of claim 1 wherein the plurality of network switches are coupled to one or more intermediate network switches.

17. The computer system of claim 16 wherein the plurality of network switches and the one or more intermediate network switches form a two-tier switching network.

18. The computer system of claim 16 wherein each of the plurality of network switches are coupled to a plurality of intermediate network switches to couple processors in the subsets of the plurality of processor groups in series.

19. The computer system of claim 16 wherein processors along a first dimension of the plurality of processor groups are coupled to the plurality of the network switches.

20. The computer system of claim 19 wherein the first dimension is a row of processors.

21. The computer system of claim 19 wherein the first dimension is a column of processors.

22. The computer system of claim 1 wherein the neural network computations are computations for training a neural network.

23. The computer system of claim 1 wherein processors configured to form the sequence are configured to process a plurality of partial layers of the partitioned neural network.

24. The computer system of claim 1 wherein processors configured to form the sequence are configured to process one or more pipeline stages of the partitioned neural network.

25. The computer system of claim 1 wherein processors configured to form the sequence are configured to adjust weights across a plurality of instances of the neural network.

26. A computer system comprising:
- a plurality of processor groups, the processor groups comprising a plurality of series configured processors to process a partitioned neural network, wherein different processors in the plurality of processor groups process one or more different layers, stages, or model instances of the partitioned neural network;
- a plurality of network switches, wherein the plurality of the network switches are coupled to subsets of the plurality of processor groups through edge processors of the series configured processors in each processor group; and
- a plurality of intermediate network switches coupled to subsets of the plurality of network switches,
- wherein at least a subset of the processors in the processor groups, one or more of the plurality of network switches, and one or more of the intermediate network switches are configured in sequences such that each processor communicates data for said layers, stages, or model instances with at least two adjacent processor in the sequence to perform Hamiltonian cycles for one or more of: data parallelism neural network computations, pipeline parallelism neural network computations, and layer parallelism neural network computations.

27. A method for processing a neural network, the method comprising:
- configuring a plurality of processors arranged in a plurality of processor groups to perform neural network computations on a partitioned neural network, wherein at least a subset of the processors in the processor groups are configured in series to form sequences of processors, and wherein different processors in the plurality of processor groups process one or more different layers, stages, or model instances of the partitioned neural network;
- configuring a plurality of network switches to coupled subsets of the plurality of processor groups together through edge processors of the series configured processors in each processor group to form at least one sequence of processors across one or more of subsets of the plurality of processor groups such that each processor communicates data for said layers, stages, or model instances with at least two adjacent processor in the sequence; and
- performing the neural network computations by the at least one sequence of processors across the plurality of processor groups.

28. A non-transitory computer readable storage medium having stored thereon program code executable by a computer system for processing a neural network, the program code causing the computer system to:
- configuring a plurality of processors arranged in a plurality of processor groups to perform neural network computations on a partitioned neural network, wherein at least a subset of the processors in the processor groups are configured in series to form sequences of processors, and wherein different processors in the plurality of processor groups process one or more different layers, stages, or model instances of the partitioned neural network;
- configuring a plurality of network switches to coupled subsets of the plurality of processor groups together through edge processors of the series configured processors in each processor group to form at least one sequence of processors across one or more of subsets of the plurality of processor groups such that each processor communicates data for said layers, stages, or model instances with at least two adjacent processor in the sequence; and
- performing the neural network computations by the at least one sequence of processors across the plurality of processor groups.

\* \* \* \* \*